United States Patent
Pena et al.

(10) Patent No.: US 9,006,927 B2
(45) Date of Patent: Apr. 14, 2015

(54) INSTALLATION FOR PRODUCING ELECTRICAL ENERGY PROVIDED WITH MEANS OF ENERGY STORAGE AND CONTROL METHOD OF SUCH AN INSTALLATION

(71) Applicant: General Electric Company, Schenectady, NY (US)

(72) Inventors: Ezio Pena, Cravanche (FR); Herve Biellmann, Eloie (FR); Maxime Buquet, Belfort (FR); Frederic Chevalier, Thiancourt (FR); Rahul Jaikaran Chillar, Marietta, GA (US); Julien Guyot, Soppe le Haut (FR); Jean Marc Ingremeau, Montbéliard (FR); Jean-louis Vignolo, Valdoie (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/114,996

(22) PCT Filed: Nov. 16, 2012

(86) PCT No.: PCT/IB2012/002861
§ 371 (c)(1),
(2) Date: Oct. 31, 2013

(87) PCT Pub. No.: WO2013/072771
PCT Pub. Date: May 23, 2013

(65) Prior Publication Data
US 2014/0244056 A1    Aug. 28, 2014

(30) Foreign Application Priority Data
Nov. 18, 2011    (EP) .................................... 11306522

(51) Int. Cl.
*H02J 3/30*    (2006.01)
*G05F 1/10*    (2006.01)
(Continued)

(52) U.S. Cl.
CPC ... *G05F 1/10* (2013.01); *F02C 1/00* (2013.01);
*F02C 6/14* (2013.01); *H02J 3/30* (2013.01);
*H02J 9/066* (2013.01); *Y02E 60/16* (2013.01);
*Y02B 10/72* (2013.01); *Y02T 50/672* (2013.01)

(58) Field of Classification Search
CPC ..................................... H02J 3/30; F02C 6/14
USPC ............................................ 307/43; 290/4 R
See application file for complete search history.

(56) References Cited

U.S. PATENT DOCUMENTS

| 4,001,666 A | 1/1977 | Grenfell |
| 5,256,907 A | 10/1993 | Shimada et al. |

(Continued)

FOREIGN PATENT DOCUMENTS

| EP | 0359027 A1 | 3/1990 |
| EP | 2595266 A1 | 5/2013 |

(Continued)

*Primary Examiner* — Joseph Waks
(74) *Attorney, Agent, or Firm* — Cantor Colburn LLP

(57) ABSTRACT

An installation for producing electrical energy and a control method of such an installation are described. The installation includes an energy storage. The installation includes an electrical energy generator that connects to a distribution network and the energy storage. The installation also includes a controller controlling the operation of the energy storage and the connection of the energy storage to the electrical energy generator and the network. The controller receives a set of information from the network or, energy storage, and the electrical energy generator, and from the network manager to control the supply of the electrical energy generator and a set of auxiliary equipment of the installation from the energy storage in the event of power failure.

21 Claims, 4 Drawing Sheets

(51) Int. Cl.
*F02C 1/00* (2006.01)
*F02C 6/14* (2006.01)
*H02J 9/06* (2006.01)

(56) References Cited

U.S. PATENT DOCUMENTS

| | | | | |
|---|---|---|---|---|
| 6,134,124 | A | * | 10/2000 | Jungreis et al. ................. 363/34 |
| 6,160,336 | A | * | 12/2000 | Baker et al. ..................... 310/74 |
| 6,169,390 | B1 | * | 1/2001 | Jungreis ............................ 322/4 |
| 6,184,593 | B1 | * | 2/2001 | Jungreis .......................... 307/64 |
| 7,302,320 | B2 | * | 11/2007 | Nasr et al. ....................... 701/22 |
| 7,411,308 | B2 | * | 8/2008 | Parmley ........................ 290/1 R |
| 7,573,144 | B1 | | 8/2009 | Saban et al. |
| 2004/0263116 | A1 | | 12/2004 | Doruk et al. |
| 2005/0035744 | A1 | | 2/2005 | Potter et al. |
| 2005/0077881 | A1 | * | 4/2005 | Capp et al. ...................... 322/29 |
| 2011/0175443 | A1 | | 7/2011 | Koyanagi et al. |

FOREIGN PATENT DOCUMENTS

| | | | |
|---|---|---|---|
| JP | 2003274562 A | | 9/2003 |
| JP | 2003339118 A | | 11/2003 |
| JP | 2006238684 A | * | 9/2006 |
| JP | 2011152013 A | * | 8/2011 |
| JP | 2011182516 A | | 9/2011 |
| JP | 2013110956 A | * | 6/2013 |
| WO | 0193410 A1 | | 12/2001 |
| WO | 0244555 A1 | | 6/2002 |
| WO | 2005029667 A2 | | 3/2005 |
| WO | 2006094128 A2 | | 9/2006 |
| WO | 2006138592 A2 | | 12/2006 |
| WO | 2013072771 A2 | | 5/2013 |

* cited by examiner

INSTALLATION FOR PRODUCING ELECTRICAL ENERGY PROVIDED WITH MEANS OF ENERGY STORAGE AND CONTROL METHOD OF SUCH AN INSTALLATION

CROSS REFERENCE TO RELATED APPLICATIONS

This application claims the benefit of priority of PCT Application No. PCT/IB2012/02861 filed Nov. 16, 2012, which claim the benefit of priority of European Patent Application Serial No. 11306522.1, entitled "Installation For Producing Electrical Energy Provided With Means Of Energy Storage And Control Method Of Such An Installation," filed Nov. 18, 2011, both disclosures of which are incorporated herein by reference in its entirety.

BACKGROUND OF THE INVENTION

Combined cycle electric power generation uses a gas turbine and a steam turbine. In production facilities, electric energy is currently based primarily on the use of hydroelectric, nuclear and fossil large-scale electricity supply systems via transmission and distribution. Reduction targets of CO2 emissions set in many countries, will bring an increase in the share of renewable energy that will reach, by 2020, 35% in Germany and 20% in France, for example. In addition to increasing their efficiency, conventional energy sources will increase their flexibility and responsiveness to be used more optimally to integrate a wider variety of intermittent power sources, such as wind farms, solar and others such as tidal power, geothermal or biomass-fed. This diversification and increasing the number of sources of production represents and involves a considerable challenge for management systems and distribution of electricity networks.

The means of generation of electrical energy and current distribution networks (Grid) were not designed to be subjected to these changes, and are thus inadequate to meet these new requirements in the long term without substantial investment. This level of renewable energy production enhances the complexity of systems and electricity distribution networks, resulting in energy fluctuations, which must be carefully controlled. Without careful control, distribution systems may operate inefficiently or may be subjected to frequent disturbances.

From the perspective of electricity suppliers and operators of distribution, the solutions must involve:
Increasing the flexibility of conventional power plants;
The introduction of energy storage technologies for use at any level, to cushion peak demands and allow the integration of more renewable energy sources;
The introduction of more flexible delivery methods to cope with fluctuations in supply, increase efficiency and optimize the system operation;
The introduction of systems for forecasting, monitoring and controlling power to prevent any disturbances.

Disturbances caused by the announced change of electrical power sources and distribution systems can cause power outages (blackouts). That is, a loss in the short or long term of electrical energy over an area due to defects in the distribution system (electrical transmission lines or sub-stations) can cause a short-circuit or overload of the main system. In particular, a "Blackout" or loss of AC power is critical to public safety, hospitals, factories wastewater treatment, mining, etc. Other critical systems, such as telecommunications systems, are also required to have a source of emergency power. That is why the systems are equipped with backup generators that start automatically when power is lost.

The appearance of defects in a Grid near a central power generation type gas turbine, steam turbine or combined cycle plant can also create disturbances or even cause the shutdown of the plant. In addition, a central electricity generation draws energy to the network to initiate the increase in speed of the turbine using an alternator in motor mode and to supply the auxiliary systems of the plant. These plants should also include elements of backup power such as batteries or diesel engines to support the buffering of seconds or ensure the normal stop and possibly restart in the event of loss of the grid. Distributed energy storage on the network can help regulate the frequency variations, quickly adjust the energy delivered to the application, to support the production of highly fluctuating power plants using renewable sources and to provide a backup power after a power failure. Moreover, the frequency control is a service designed to reduce the differences in frequencies across networks. The frequency differences result from imbalances between supply and demand for electricity that occur continuously during normal operation or after an incident such as loss of production. The nominal frequency in Europe is set to 50.00 Hz. The minimum frequency is set to Instant 49.2 Hz and the maximum instantaneous frequency is set to 50.8 Hz. This corresponds to a difference of 800 mHz, the maximum permissible frequency deviation from nominal frequency dynamics (ENTSO-E 2009). In practice, the beaches are a wider snapshot of 46 Hz to 52.5 Hz.

There are three levels of frequency control regulation, namely the primary control, secondary control and tertiary control. The generating units of electricity are required to provide a reserve during nominal operation to ensure a primary response frequency control. In Europe, this reserve may vary by country. It is for example +/−2.5% in France and +/−1.5% in Spain.

Activation of the primary reserve is triggered before the frequency deviation from the nominal frequency is greater than 200 mHz and at a minimum time of less than 30 seconds and a maximum of 15 min. The use of energy storage means can therefore also contribute to regulating the frequency in continuous operation with a quick response. Finally, it should regulate the phase shift between voltage and current, resulting in a reactive power control. Charges including windings have a magnetizing effect producing reactive power. This does not work, but summed vectorially with the active power (billing demand), it compiles the power which defines all the energy flowing through the Grid network and system sizing. Optimizing the power factor can reduce Grid network losses, maximize the flow of active power (or the design of smaller facilities) and increase stability. Again, the means of energy storage can be used to regulate this phase shift.

The storage means may also serve as energy sources required when starting plants and to avoid buffering the adverse DC power required for hospitals, data centers and backup systems nuclear power plants.

It is within this context that flywheels are considered as a means of kinetic energy storage. These systems, similar to a battery, consist of the rotation of a flywheel (carbon fibers, other composites, steel, or the like), up to several tens of thousands of revolutions per minute, coupled to a motor/generator. They store/deliver electric energy surplus/deficit on the network, at some point in the form of kinetic energy (Ek) that is recovered by accelerating/decelerating mass. The energy stored/returned is given by the following formula:

$$E_k = \tfrac{1}{2} * J * \omega^2 \qquad [\text{EQ 1}]$$

Where J is the moment of inertia (in kg·m$^2$) and ω is the angular velocity (in rad s$^{-1}$).

To avoid frictional losses, storage systems are supported by magnetic bearings and enclosed in a vacuum chamber. They also include power electronics devices such as a rectifier-inverter combination to ensure the control of the signal injected/removed from the network and, in particular, control of power factor (cos φ). This technology is used, among others, for frequency regulation as a solution for uninterruptible power supply, for power optimization in embedded systems, in areas such as electrical distribution, aerospace, automotive (recovery of kinetic energy during braking), and the railway.

As part of the electrical power distribution and stability of power systems, these storage systems are advantageous because they have a response time less than a second, a life of twenty years, with little maintenance. Moreover, unlike batteries, they have no "memory effect", they do not fear changes in temperature and charge state is precisely measurable. Finally they do not require recycling, precautions or special operation. Currently and for reference, some of these devices, as marketed now, have a mechanical efficiency of over 95% and a total return (round-trip charge/discharge) of 85%. Some can reach a storage capacity of 25 kWh, delivering an instantaneous power of 250 kW and undergo more than 150,000 cycles of charge/discharge. Various types of systems are known to avoid disruptions of electricity supply and regulate the frequency and power. For example, EP 1900074 and EP 1866717 describe various types of power systems to offset peak demand and prevent service interruptions. EP 1866717 advocates including the use of a mini-network, comprising one or more sources of power generation and one or more independent loads, which can be connected to the grid in response to a disturbance. Documents U.S. 2005 0035744, EP 1656722, EP 359027, U.S. Pat. No. 5,256,907, WO 2002 44 555, U.S. Pat. No. 4,001,666, JP 2003 274562 describe, in turn, the use of flywheels. U.S. 2004 0263116 describes an intelligent system of distribution/storage of energy for power management of the demand side. A device is used for storing electrical energy near the point of use or production. JP 2003 339118 describes a system power supply unit including a distributed wind generation, photovoltaic generation unit, a unit of energy storage, a flywheel and a charging unit.

BRIEF DESCRIPTION OF THE INVENTION

In view of the foregoing, the present invention provides a method for controlling a power plant generation type gas turbine or combined cycle which overcomes the aforementioned drawbacks.

Indeed, a gas turbine/steam turbine or combined cycle power plant produces electricity directly. However it is dependent on the electricity network to ensure its start by supplying the generator in motor mode (for a gas turbine) and to ensure the supply of auxiliary circuits necessary to drive lubrication, supply fuel and cooling, heat and vacuum the condenser. These circuits are often composed by mobile pumps and motorized fans, valves etc.

This equipment is equipped with a redundant power supply in case of absence or in case of failure of the main power grid.

As mentioned above, there are now several ways of storing electrical energy necessary for the operation or shutdown of electricity generating plants such as power gas turbine/steam turbine and combined cycle plants. These means are adequate to ensure load transfer of, pumps, fans, cabinets, in case of failure of the main or central systems, to supply low and medium voltage to the batteries. In case of loss or "blackout" of the network, means for generating relief must be provided to enable the auxiliary systems in high and medium voltage to ensure a safety shutdown of the shaft and/or the possible start of the alternator in safety mode. Typically these devices include diesel engines, some of which are redundant, which must be continuously preheated and pre-lubricated to be ready to start. Moreover, by measuring and safety, these engines must follow regular tests start. The investment and installation of the packaging of these means of storing and generating is sometimes very sporadic. Furthermore, the degradation of the battery over time is generally due to the extent that this degradation occurs at each cycle of loading and unloading (hysteresis). Another problem is the reaction time of these means of storage and generation, limiting the reaction time to limit the impact of fault on the network and the plant.

According to one aspect, the invention provides a system of power plant generation and process control of such a facility that uses a flywheel type energy storage to ensure the following functions:

Control of frequency and voltage (steady state and transient);
Support for buffering Grid network;
Ensuring an optimal state of charge of the storage means in case of power loss;
Use of energy stored in mechanical form in shaft to support the system stop (including the limitation of the phenomenon of overspeed of the shaft)
Support to plant startup in case of prolonged outage of the network.

Passive or active compensation of harmonics generated by the various elements of electronic means of power generation and renewable energy storage means by a flywheel.

In view of the foregoing, the invention aims to increase the responsiveness, flexibility and reliable operation of electricity generating plants connected to networks with the characteristics listed above.

More particularly, the present invention relates to an installation for power generation, comprising means for generating electrical energy intended to be connected to a distribution network including means for storing electrical energy.

This installation further comprises a controller controlling the operation of energy storage means and connecting the storage means to said means for generating and/or said GRID network in order to maximize their use. The controller receiving a set of information from a network, means for energy storage, means for generating electrical energy and of the system operator to control the generation of energy to the network and to the auxiliary systems installation from the energy storage means.

And the controller is capable of receiving information from a network manager (voltage, frequency, application to increase or decrease in the active or reactive power) and is thus provided with means allowing it to manage the charging and discharging of the energy storage means to carry out several functions sequentially, after ensuring the optimal load level (partial or maximum), required to ensure functions of each.

The integration of storage means allows their use as a providing medium to meet the demand of peak starting current of the gas turbine. Indeed, the storage means to reduce the rated power may even eliminate duplication of generators needed to start.

During startup, the power demand is caused by the start-up systems. The means allow energy storage to smooth the active power demand. In this case, the controller must ensure a maximum load storage means between calls of power peaks allowing sizing the starting system for a nominal response that would be less than that required by the power peaks. The system design can start (e.g., follow a slope of linear power with a constant slope).

The controller can also detect a sudden decrease in supply voltage or power below a threshold value below which the auxiliary systems no longer provide their functions properly.

According to another feature of the installation, the controller is adapted to regulate the level of primary reserve available in the installation from the available energy in the energy storage means.

According to yet another feature, the controller is adapted to control the supply of electricity to the grid from the means of storing energy in response to a request from the network manager The controller can be adapted to participate in regulating the frequency of the network depending upon the network operator and the energy available in the energy storage means.

The controller may be further adapted to control the supply of electrical energy to the auxiliary systems of the plant from the energy storage means in case of fall of the voltage for a predetermined time.

For example, the means of generating electrical energy comprising a generator coupled to a gas turbine or steam, the controller is adapted to cause charging of the energy storage means, to stop the generation means of electric power from the inertia of a shaft means generating electrical energy.

In one embodiment, the controller is adapted to control the level of active power and/or to provide the reactive network from the energy available in the energy storage means.

For example, the energy storage means comprise a set of at least a flywheel coupled to a motor/generator and/or a set of batteries.

To maintain the rotation of the flywheel, you can use a set of auxiliary power sources, for example batteries or renewable energy devices connected to their associated power electronics and adapted to maintain the rotation of the loaded flywheel.

For example, the energy storage means comprise power electronic devices for regulating the current, voltage and frequency passing through the storage means.

The invention also relates to a method for controlling an installation for power generation comprising means for generating electrical energy intended to be connected to a distribution network and comprising means for electrical energy storage and a controller controlling the operation of energy storage means and the connection of storage means and said generating means to said network.

According to one characteristic of this process, the controller controls the production of energy to the network and to the auxiliary systems of the installation from the energy storage means, and from a set of information from the network, means energy storage means and generating electrical energy, and it controls the storage means for providing different functions sequentially ensuring optimal state of charge between two functions.

In one implementation, the controller regulates the level of primary power reserve available in the installation from the energy available in the energy storage means.

The energy supplied to the network by the storage means is preferably the difference between the energy demand of a transmission system of distribution and the energy supplied by the means of generating electrical energy, limited by the inertia of the gas turbine and steam turbine.

For example, the controller regulates the frequency of the network at the request of a transmission distribution system from the energy available in the energy storage means.

In one implementation, the means of generating electrical energy comprises a generator coupled to a gas or steam turbine that loads the energy storage means so that, during the stop phase of the electrical energy generation means, energy is provided from the inertia of the shaft to the electrical energy generating means.

Preferably, the energy storage means are able to support starting the system, thus limiting the calls to the networks or current generators after stopping of the network.

For example, the energy storage means are capable of supporting stopping of the means of electric generation in feeding the auxiliary systems.

According to a mode of implementation, the controller detects/receives information from the network voltage drop and provides electric power to auxiliary systems of the plant from the means of energy storage.

The energy storage means may participate in maintaining the mains voltage and is fed into electrical energy of the auxiliary systems from the central storage means energy in case of a fall of the supply voltage for a predetermined time.

The controller can also control the level of active power and/or to provide the reactive network from the energy available in the energy storage means.

BRIEF DESCRIPTION OF THE DRAWINGS

Other objects, features and advantages of the invention appear on reading the following description, given purely by way of example and with reference to the accompanying drawings in which.

DETAILED DESCRIPTION OF THE INVENTION

Figure 1:
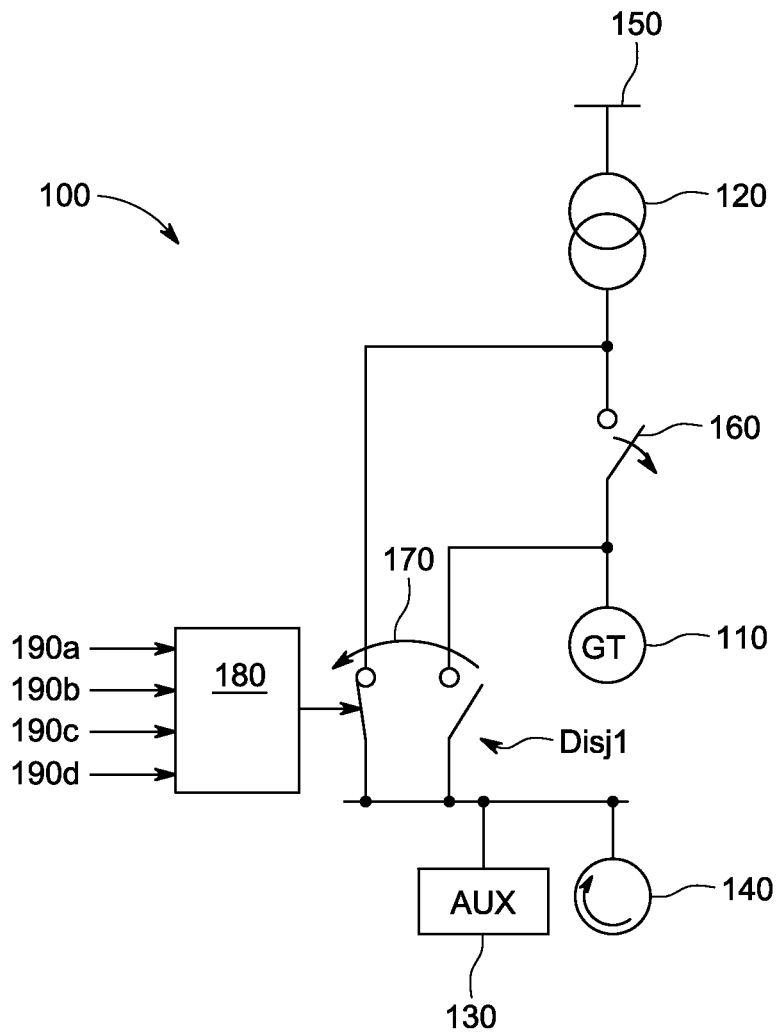
FIG. 1 is a schematic view of an installation for supplying electrical energy according to the invention, with means of storing electrical energy.

Referring first to FIG. 1, the architecture of a plant for producing electrical energy (central power generation system 100) is described according to an embodiment of the invention. As shown in FIG. 1, which includes a portion of a central power generation system 100 with a gas turbine 110 or combined cycle, such a production facility includes an electric power generator, for example a gas turbine 110 coupled to an alternator and connected to a distribution network 150 by means of a transformer 120. During normal operation of the plant, the generator delivers electrical power to the grid. When starting, the generator operates in motor mode and draws energy on the network to drive the turbine. The facility is also equipped with auxiliary systems 130, of various kinds, ensuring the execution of accessory functions, including lubrication pumps and cooling fan motor, power supply circuits of the turbine fuel, and a valve assembly.

The facility is also equipped with a means of energy storage in the form of kinetic energy (MSEC). For example, and in no way limiting manner, such energy storage means 140 are arranged in the form of a set of at least one flywheel, constituted, for example, by flying carbon fiber, composite material, in steel, driven in rotation under the action of a motor/generator supplied with power removed from the network 150 and capable of converting kinetic energy into electrical energy of the flywheel, and also capable of converting the kinetic energy resulting from the rotation of the alternator to ensure electrical charging for storage.

As shown, the auxiliary systems 130 and the energy storage means 140 are connected between the transformer 120 and generator breakers 160 through switches 170 controlled by a controller 180. As will be described in detail below, the controller 180 is connected to the main elements of the installation and to the network 150 to retrieve information relating to network 150 operation and installation. The controller 180 includes software and hardware and is suitably programmed to control the charging and discharging of the energy storage means 140 based on information collected and to implement sequential phases of load and/or discharge to perform functions controlling the operation of the installation. Additionally, a breaker 160 is also provided between the generator (e.g., gas turbine 110) and the transformer 120.

The controller 180 manages the operation of the energy storage means 140 to provide several functions necessary to ensure the reliability and flexibility of the central power generation system 100 in the face of network events.

The management method implemented by the controller 180 also extends the functionality of the energy storage means 140 to functions specific to the plant. It is particularly aimed at stretching the capacity of energy storage to meet the primary reserve (total or partial), especially in the first moments of the additional demand for power to compensate for the slope of increase in power limited by the acceleration of the gas turbine 110, by the inertia of the steam cycle and the various constraints on the plant.

This reserve is required by the operator of the grid. For example, the gas turbine 110/steam turbine or combined cycle may be forced to drop its operating point up to 95% (by country) or to provide supplemental power if needed.

Note that the functions performed by the energy storage means 140 are provided in sequence, the controller 180 ensuring optimal charging means for storing energy between the implementation of two functions and ensuring an optimal state of charge required prior to each of the functions to be performed.

The method implemented on the energy storage means 140 controlled by the controller 180 allows the use of the energy storage means 140 sporadically and can transfer a function performed by the gas turbine 110 to the energy storage means 140, thereby maximizing the use of the resource.

Unlike the solutions according to the prior art, according to which there is no distinction between the use of specific batteries and kinetic storage means, by the characteristics of charging and recharging of the energy storage means 140, their absence of hysteresis, the energy storage means 140 offers advantages compared to batteries.

The integration of the energy storage means 140 to a central power generation system 100 allows it to better withstand network incidents including: significant reduction of tension, and the loss of the network (referred to as "blackout").

Also the energy storage means 140 can replace the central reservation to provide primary or supplemental energy to start to clear the peak inrush current during start of recirculation pumps or starter alternator. Indeed, the auxiliary systems 130 and the energy storage means 140 help smooth the demand for active power required to start.

As shown in FIG. 1, the controller 180 receives, as input, a set of information 190*a* from the network 150.

The controller 180 also receives information 190*b* related to the operation of the energy storage means 140, information 190*c* about the central power generation system 100 electric power, and information 190*d* from the network manager.

The network operator, the controller 180, and energy storage means 140 communicate with each other.

The controller 180 receives information from the network operator, including: the frequency, voltage, power demand force to provide for regulating the frequency of the network or application to control the reactive power. The controller 180 also receives information from the unit including: the level of primary reserve available in the central power generation system 100 and the energy storage means 140.

From this information 190 and information from the plant, the controller 180 manages the charge level of the energy storage means 140.

The controller 180 manages the application of energy necessary for starting the auxiliary systems 130, and the regulation of the reactive power in the medium voltage grid of the plant.

The controller 180 also operates the circuit breaker 160 for connecting/disconnecting the alternator of the network 150.

One function to be performed by the means of energy storage 140 is that of ensuring the primary reserve, because the turbine must operate for example at a maximum of 95% of its nominal power (if non-peak operation). The reserve must be delivered to the grid at the request of the network operator, which thus has an energy reserve in case of failure of electricity generation systems. This reserve contributes to the stability of the network 150 by maintaining a frequency around 50 Hz or 60 Hz depending on the type and characteristics of the network 150.

In this case, the energy storage means 140 can respond more quickly at the request of the network operator, possibly limiting the overall failure sequence or by lengthening the response time needed for other network generators.

The controller 180 must ensure a supply of energy in kWh or MWh to the grid by a rapid discharge of the energy storage means 140, equal to the difference between energy demand requested by the system operator, less energy supplied by the alternator of the plant.

Figure 2:
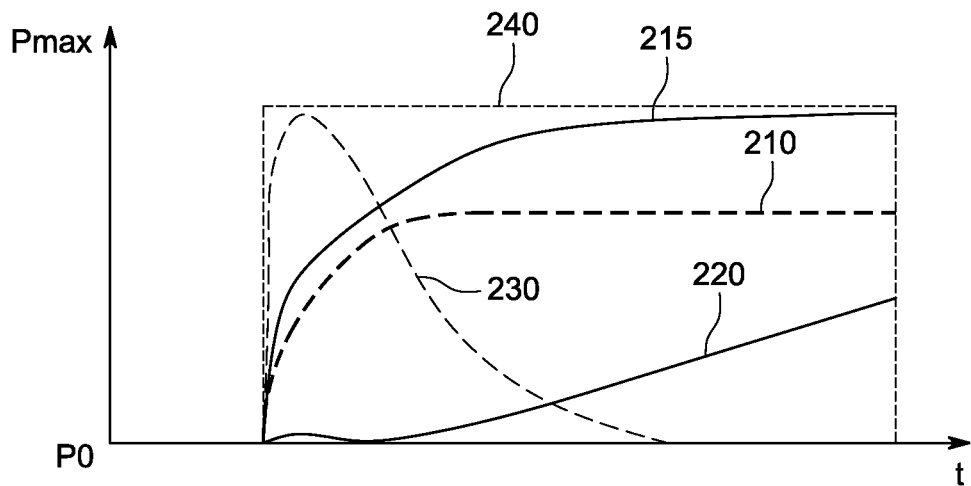
FIG. 2 is a diagram illustrating the operation of a controller to meet energy demand in the medium frequency control.

As shown in FIG. 2, the power response to an instruction supplied by the power generation system 100 is indicated by the curve 210 for the power supplied by a gas turbine 110, the curve 220 for the power supplied by a turbine steam, the curve 215 for the power supplied by the gas turbine 110 and steam turbine, and 230 for the power supplied by the energy storage means 140. In all cases, in the absence of the energy storage means 140, the ramp rise of the facility is limited by the ramp of rise of the gas turbine 110 over that of the steam turbine. However, the rise of a plant is not only dependent on the size of the plant and the type of gas turbine 110, but is also limited by the inertia of the steam cycle. For large plants, this slope can be typically about 10 to 25 MW per minute or more to power the latest generation.

Thus, the use of the energy storage means 140 can provide a momentary elevation and sudden power, thereby improving the slope of increase in power delivered by the plant and its reaction time and, therefore respond accurately to demand (curve 240).

Note that the use of the energy storage means 140 to achieve this function, in part, has several advantages:

Prompt response to requests from primary reserve;

Ability to temporarily increase the operating point of the machine as the primary reserve may be totally or partially guaranteed by the energy storage means 140;

Decreased use of technology. When the request can be ensured by the energy storage means 140, this allows limiting the maintenance cycles by a reduction of hours of operation "overfiring", that is to say, in operation, allowing a higher exhaust temperature r, and therefore a higher flame temperature, which allows an increase of the basic power of 3 to 7% (depending on the type of combustion), but which deteriorates the installation.

After each response, the controller 180, designed to meet the primary reserve by requesting the energy storage means 140, causes a recharge of the energy storage means 140 by controlling the circuit breakers 170 so as to connect the energy storage means 140 to the network 150 to supply the energy storage means 140.

Recharging is done following each solicitation of the energy storage means 140 from the electricity network 150 or at a time when the network manager requests absorption of the active power of the network 150 to decrease the frequency of network 150.

The energy storage means 140, however, must keep a minimum charge at all times in case of a sudden decrease in voltage of the network 150. This minimum charge is estimated from the minimum energy to supply all the equipment that might be affected by the reduction of voltage for a period of time (e.g., a few seconds).

Figure 3:
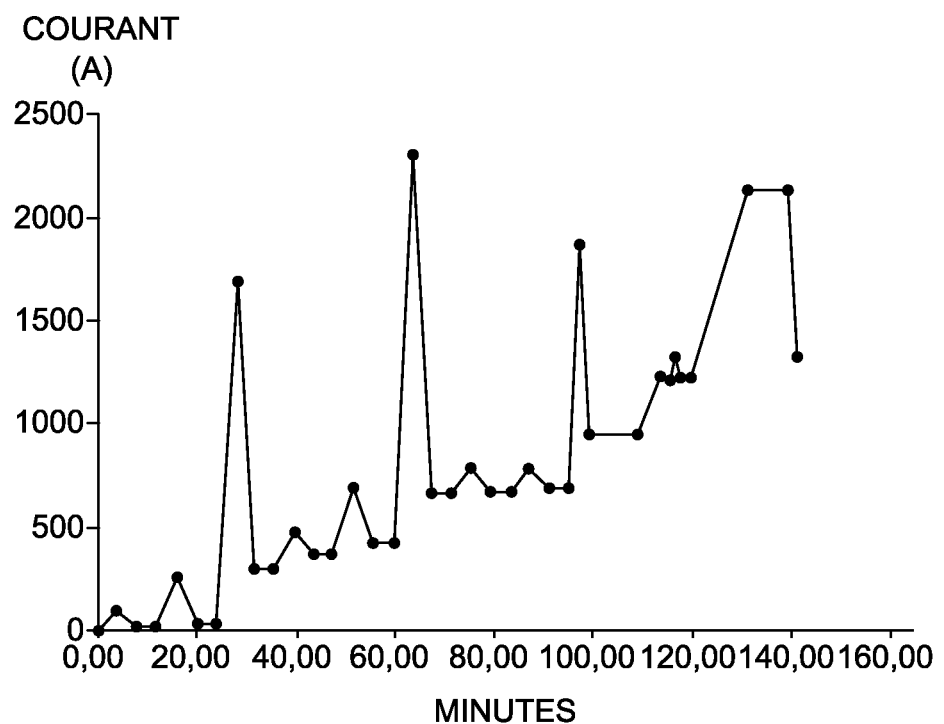
FIG. 3 is a graph showing the abrupt rise in current consumption when starting the installation.

Another feature provided by the controller 180 and the energy storage means 140 is the support at the start of the gas turbine 110. This support allows resizing of the electricity generation systems needed to provide a current, independent of the network 150, to start in case of "blackout". In this case, and as shown in FIG. 3, the current consumption and power is characterized by occasional peaks of consumption, each corresponding to starting equipment installation, for example a pump unit for circulating lubrication and cooling or an inverter switched by the load (LCI) necessary to power the generator.

In order to stabilize the demand for power generation by groups of emergency power generators, the controller 180 seeks the energy storage means 140 to provide a timely response to increased electricity demand resulting from the startup of this emergency power equipment. Thus the means for generating emergency power can be resized.

Moreover, at a stop of the gas turbine 110, the controller 180 operates circuit breakers 160 and 170 so as to connect the alternator to the energy storage means 140. The speed of rotation of the alternator is increased and converted into electricity by the motor/generator associated with it and is then used to recharge the energy storage means 140 in order to ensure full recharge. Charging the energy storage means 140 is thus achieved during stop phases using the kinetic energy of the shaft of a generator, at the same time limiting overspeed caused by a sudden and possible disconnection of the alternator.

Figure 4:
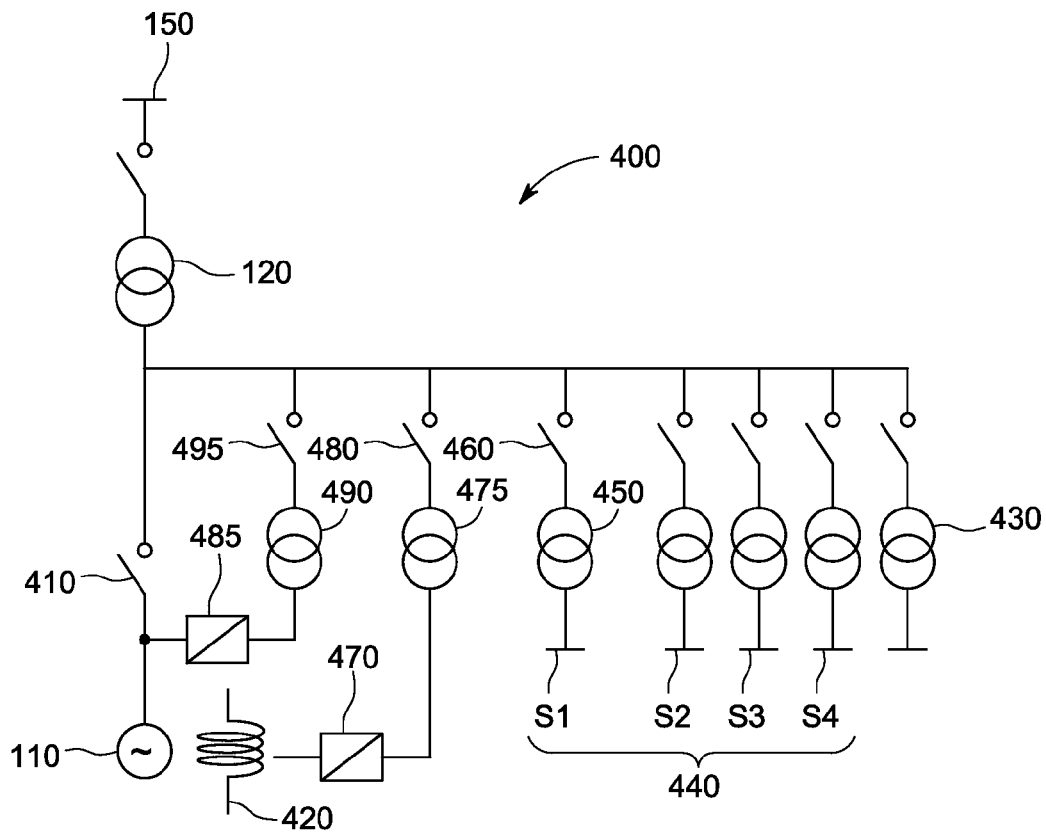
FIG. 4 is a view of another embodiment of an installation of electric power according to an embodiment using systems of complementary power generation.

The kinetic energy thus stored can be maintained indefinitely, the losses represent only 2% of rated power, compared with using alternative means of power generation close to the central power generation system 100, based for example on the use of renewable energy, or based on the use of batteries or emergency generator means such as diesel engines used conventionally for the shutdown or startup of the facility safely. However, at any time, the energy storage means 140 can be charged directly from the network 150 as soon as the network 150 becomes available again to deliver electricity. FIG. 4 shows a facility with such means for generating electrical power.

As shown in FIG. 4, the transformer T 120 is connected to networks 440 via a circuit breaker 410, to an alternator 420 associated with its electric energy generating means 430 and the storage of electric energy as kinetic energy. The MV medium-voltage network 400 has a number of additional sources of energy 440, such as S1, S2, S3 and S4, constituted for example by conversion systems renewable energy such as solar, wind, etc., connected to the MV transformer stations, such as 450, by 460, also controlled by the controller 180 (not shown in this Figure).

As seen, the medium voltage grid MV 400 also has an exciter alternator 420, associated with a transformer 475 and a circuit breaker 480 and a static frequency converter 485 also associated with a transformer 490 and to a circuit breaker 495.

The energy storage means 140 may be inertial, and while restarting the gas turbine 110/steam turbine, and during its combined cycle operation, provide support to erase the current peaks when starting pumps, especially those of recirculation, and during feeding of the inverters to the load by switching LCI. The energy storage means 140 can thus reduce the rated power of diesel engines used conventionally for the restart of the turbine, or even deliver power in the first moments of the start, allowing for sufficient time to start such motors, thus avoiding the pre-heat or pre-lubricated continuously.

The energy storage means 140 makes it possible to smooth the active power demand. In this case, the controller 180 manages to deliver energy in very short periods allowing a response to all the current peaks.

The dimensioning of the system's startup facility can then be constructed to comply with a slope of constant power, for a limited power demand.

Regarding the sizing of the energy storage means 140, three criteria can be used.

First, the sizing may be to clear consumption peaks resulting from equipment start in the installation, as described above with reference to FIG. 3.

The energy storage means 140 may also be sized to limit the maximum power of a group of diesel motors which is conventionally provided with the installation.

The energy storage means 140 may finally limit the constraints of emergency generators of generations back by assuring a steady increase in power ("ramping").

As mentioned above, in case of loss of network or a "blackout", the controller 180 controls the additional 160 breaker so as to disconnect the generator (e.g., gas turbine 110) from the network and cause it to stop in a mode called "security". The controller 180 also controls the circuit breakers 170 so as to connect the generator (e.g., gas turbine 110) to the energy storage means 140.

The sharp rise in the speed of the shaft, converted into electrical energy by the motor/generator associated with is the alternator 420 is used to recharge the energy storage means 140. The energy storage means 140 may well be fully charged in seconds with the inertia caused by overspeed.

This system of charging the energy storage means 140 is advantageous over conventional systems, based for example on the use of diesel engines, the latter being constantly pre-greased and preheated in order to get started quickly.

These drawbacks are avoided by the use of a storage system of kinetic energy, which is charged and deflected during a blackout by the controller 180 to ensure the operation of accessories for the shutdown sequence, which lasts about 10 min.

Moreover, in the event of failure or unavailability of the diesel engine spares, which classically central team to provide electric power to stop the equipment safely, the energy storage means 140 can also be ordered to take over during the shutdown of the machine and feed the essential auxiliaries such as lubrication and cooling necessary for stopping the machine in good condition.

The controller 180 can also be adapted to detect a sudden decrease in the voltage of the network 150 to which the central power generation is connected below a threshold value. This is, for example, to detect a voltage drop for a period of time of at least 2 seconds. In this case, the controller 180 controls the circuit breakers 170 and the energy storage means 140 in order to maintain a minimum voltage in the energy storage means 140 components needed to power components too sensitive to decreases in voltage.

Note also that the present invention provides a method of controlling a system of power generation, gas turbine or combined cycle, that allows implementation of frequency regulation or voltage regulation, in steady state or transient conditions.

Figure 5:
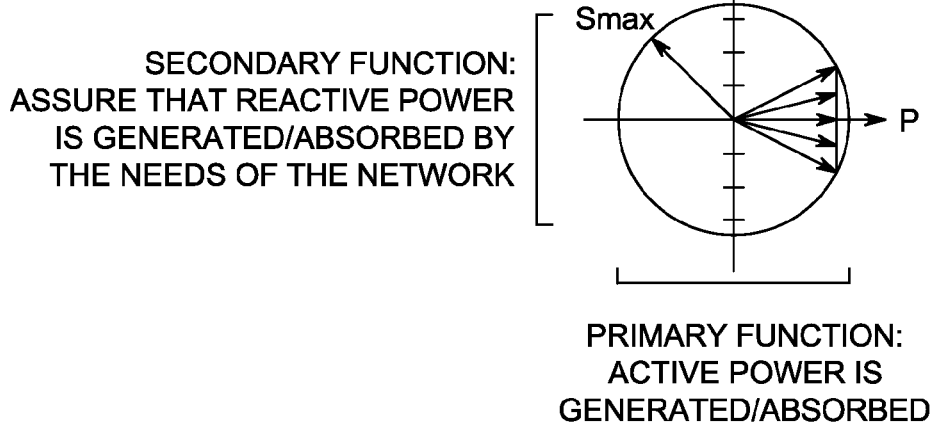
FIG. 5 is a diagram showing an example of regulation of frequency and voltage.

Referring to FIG. 5, the two regulations can be combined under the control of a controller 180 to provide, first the active power or absorbing the active power by controlling the charging and discharging of the energy storage means 140 and, secondly, once the active power level is provided, ensure a secondary function of providing or absorbing the reactive power Q of the network 150.

Note that these two types of regulations can be simultaneously optimized control. We take the example of a restriction of the maximum active power deliverable/absorbed about 13.4%, which can generate reactive power (inductive or capacitive) of up to 50% of maximum power.

Figure 6:
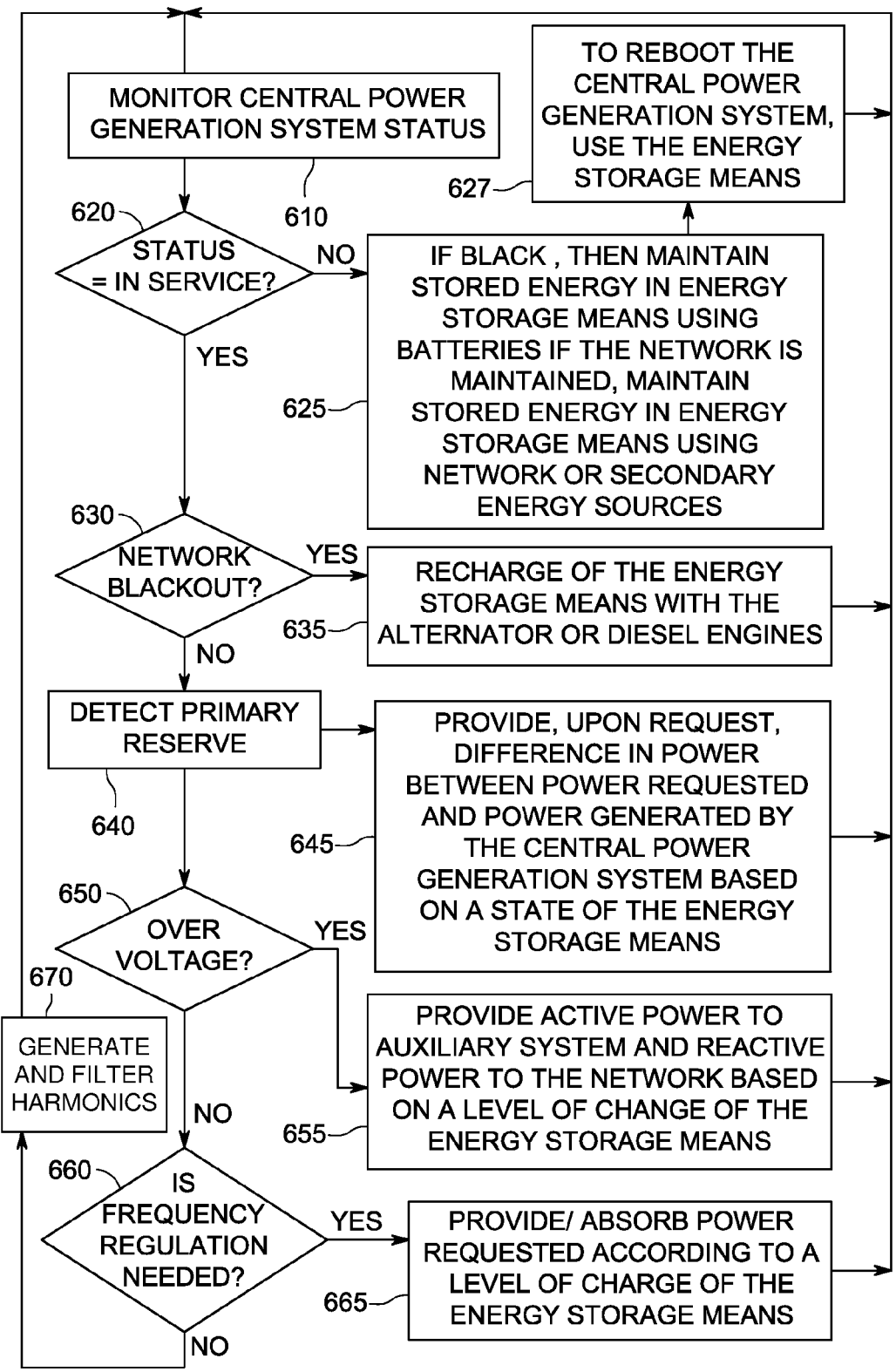
FIG. 6 is a flowchart illustrating the processes implemented by the controller in the management of storage media.

We can finally refer to FIG. 6, which is a schematic representation of the process used by the controller 180. The logic diagram form, in no way limiting, represents the different functions to be performed according to information received by the controller 180, and management means for storing energy for charging, the discharge for these storage means and their connection to the distribution system or network of the plant.

As shown in FIG. 6, at block 610, the controller 180 monitors the central power generation system 100 status, for example from the control value of a variable-state plant. At block 620, it is checked, for example, if the generator (e.g., gas turbine 110) is running or stopped. If the generator is stopped, in case of loss of the network 150, for example detected from the variable control of a blackout, then, as shown at block 625, the energy stored in the energy storage means 140 is maintained using energy in the batteries. Otherwise, if the network 150 is maintained, the stored energy is maintained using the network 150 or secondary energy sources, such as renewable energy sources. If the central power generation system 100 is to be rebooted (started), the energy stored in the energy storage means 140 is used (block 627).

If, at block 620, it was determined that the central power generation system 100 is in operation, in case of loss of network 150 detected at block 630, the energy storage means 140 is charged by the alternator, as shown at block 635, or, when disconnected from the alternator, by diesel engines.

At block 640 a request for detecting primary reserve may be received and processed at block 645, for example from the control of a variable Primary Service. At block 645, to ascertain the primary reserve, the controller 180 determines a power level corresponding to the difference between the requested power and power that can be delivered by the central power generation system 100, based on the state of the energy storage means 140. At block 650, when an overvoltage is detected on the network 150 and a surge on the internal network of the plant (represented by variable LVRT), the controller 180 processes the condition at block 655. At block 655, when there is an over-voltage condition on the distribution network 150 or on the internal network of the central power generation system 100, power is delivered to the auxiliary systems or is absorbed, and reactive power is supplied to the network 150 depending on the level of charge of the energy storage means 140.

At block 660, it is detected whether frequency regulation is required, for example by variable control of a Frequency-regulation. If this is the case, at block 665, the controller 180 controls providing or absorbing power according to the required frequency and depending on the state of charge of the energy storage means 140.

Finally, at block 670, values of harmonics are generated and the harmonics are filtered. As shown, the process may then return to monitoring the central power generation system 100 at block 610.

The invention claimed is:

1. An installation for producing electrical energy, comprising:
   means for generating electrical energy, said means including one of a type gas turbine, steam turbine, combined, coupled to an alternator, or renewable energy sources, said means being connected to a distribution network;
   energy storage means for storing kinetic energy and the electrical energy;
   means for generating electrical power;
   a controller configured to control operation of the energy storage means and to control a connection of the energy storage means to said network and a connection of said means for generating electrical energy to said network, the controller controlling the energy storage means to provide active or reactive power to said network and to auxiliary systems of the installation based on a set of information received, respectively, from the network manager, the energy storage means, said means for generating electrical energy and the system operator.

2. The installation according to claim 1, wherein the controller controls the level of primary reserve available in the installation from the energy available in the energy storage means.

3. The installation according to claim 1, wherein the controller controls a supply of electrical energy from the energy storage means in response to a request from the network manager.

4. The installation according to claim 1, wherein the controller regulates the frequency of the network based on the network operator and on energy available in the energy storage means.

5. The installation according to claim 1, wherein the controller controls a supply of electrical energy to the auxiliary systems of the plant from the energy storage means in case of a fall in voltage for a predetermined length of time.

6. The installation according claim 1, wherein the means of generating electrical energy comprises a generator coupled to a gas turbine or steam turbine, the controller controlling recharging of the energy storage means, and stopping the means for generating electrical energy using inertia of a shaft of the means for generating electrical energy.

7. The installation according to claim 1, wherein the controller controls a level of the active power or provides a reactive network from energy available in the energy storage means.

8. The installation according to claim 1, wherein the energy storage means comprises a set of at least a flywheel coupled to a motor and generator or a set of batteries.

9. The installation according to claim 8, further comprising a set of auxiliary power sources of electrical energy connected to their associated power electronics and configured to maintain rotation of the flywheel.

10. The installation according to claim 9, wherein the auxiliary power sources are batteries or renewable type energy.

11. The installation according to claim 10, wherein the energy storage means comprises power electronic devices for regulating the current, voltage and frequency passing through the energy storage means.

12. The method according to claim 9, wherein the energy supplied to the network by the energy storage means is a difference between energy demand of a distribution network manager and energy supplied by the means for generating electrical energy, limited by the inertia of the gas turbine and steam turbine.

13. A method of controlling an installation for power generation comprising means for generating electrical energy intended to be connected to a distribution network and energy storage means for storing electrical energy and a controller controlling the operation of energy storage means and a connection of the energy storage means and said means for generating electrical energy to said distribution network, the method comprising:
controlling the energy storage means to provide active or reactive power to the network and to the installation of auxiliary systems based on a set of information from the distribution network, the energy storage means, and the means for generating electrical energy, and
controlling the energy storage means to provide different functions sequentially, ensuring optimal state of charge between two functions.

14. The method of claim 13, further comprising regulating a level of primary power reserve available in the installation from the energy available in the energy storage means.

15. The method according to claim 13, further comprising regulating frequency of the distribution network at the request of a transmission distribution system based on energy available in the energy storage means.

16. The method according to claim 13, wherein the means of generating electrical energy comprises an alternator coupled to a gas or steam turbine to load the energy storage means, inertia of a shaft of the means for generating electrical energy is used to stop the means for generating electrical energy.

17. A method according to claim 13, wherein the energy storage means starts the system, thereby limiting calls to groups of generators after disconnection of the distribution network.

18. A method according to claim 13, wherein the energy storage means supports stopping of the means for generating electric energy in feeding auxiliary systems.

19. The method of claim 13, wherein the controller detects or receives information about voltage drop of the distribution network and provides electrical energy to auxiliary systems of the plant from the energy storage means.

20. The method of claim 19, further comprising maintaining the distribution network voltage and supplying auxiliary systems of the installation with electrical energy from the energy storage means in case of a drop in distribution network voltage for a predetermined length of time.

21. The method according to claim 13, further comprising regulating a level of the active power or providing a reactive network from energy available in the energy storage means.

* * * * *